No. 663,603. Patented Dec. 11, 1900.
J. E. DOAK.
TRANSMISSION AND REVERSING GEAR.
(Application filed Mar. 28, 1900.)
(No Model.)
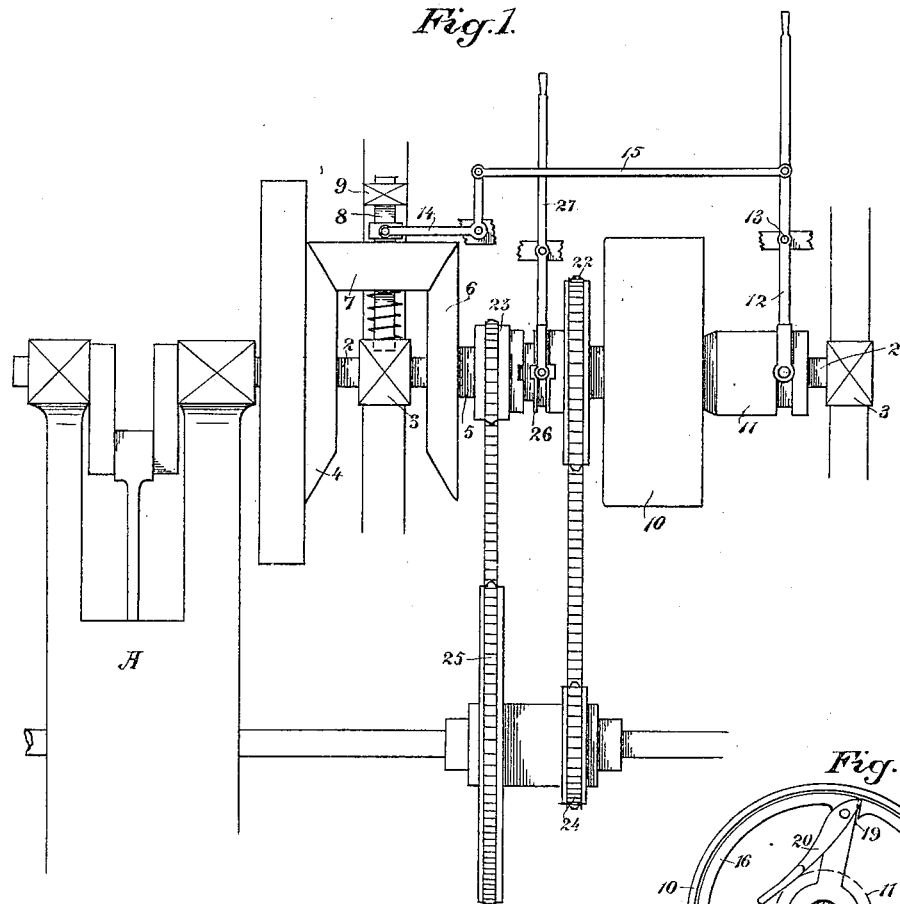

UNITED STATES PATENT OFFICE.

JOHN E. DOAK, OF SAN FRANCISCO, CALIFORNIA, ASSIGNOR OF ONE-HALF TO WILLIAM LEVISTON, OF SAME PLACE.

TRANSMISSION AND REVERSING GEAR.

SPECIFICATION forming part of Letters Patent No. 663,603, dated December 11, 1900.

Application filed March 28, 1900. Serial No. 10,480. (No model.)

*To all whom it may concern:*

Be it known that I, JOHN E. DOAK, a citizen of the United States, residing in the city and county of San Francisco, State of California, have invented an Improvement in Transmission and Reversing Gear for Engines; and I hereby declare the following to be a full, clear, and exact description of the same.

My invention relates to a novel transmission and reversing gear for engines.

It consists of a shaft, a sleeve loose on the shaft, a clutch by which the sleeve may be fastened to and rotate with the shaft, a reverse mechanism by which the sleeve may be made to rotate in the opposite direction to the shaft, and a mechanism by which the sleeve can be disengaged from both the clutch and reversing mechanism and not rotate and by which when the sleeve is engaged to the shaft by the clutch it is disengaged from the reversing mechanism and will rotate in the same direction as the shaft and by which when the sleeve is engaged with the reverse mechanism it is disengaged from the clutch and will rotate in the opposite direction to that in which the shaft rotates. The sleeve is provided with sprocket or other power-transmission wheels and a clutch mechanism by which either of the wheels may be made to rotate with the sleeve and the speed of the driven parts varied whether the sleeve is rotating with the shaft or in an opposite direction.

My invention also comprises details of construction which will be more fully explained by reference to the accompanying drawings, in which—

Figure 1 is a plan view illustrating my apparatus. Fig. 2 is a sectional view of the sleeve and other parts mounted upon the shaft. Fig. 3 is an end view of a form of clutch.

This invention is applicable to any apparatus where power is to be applied in either direction and in which a variable speed is desirable. These conditions are especially requisite in motor-vehicles, and the apparatus here described is very desirable for such a purpose.

In the drawings I have illustrated an engine or motor A, which may be of any description and capable of transmitting power to a shaft 2, which is suitably journaled in boxes, as at 3. Keyed to this shaft is a driver 4, which may be of any suitable or well-known construction. I prefer to use a driver in which frictional contacting surfaces of sufficient capacity can be employed to transmit the power applied through this driver. Upon the shaft 2 is mounted a sleeve 5, which is loosely turnable upon the shaft, and upon this sleeve opposite to the driver 4 is a second driver 6. Intermediate between these two drivers 4 and 6 is a transmitter 7, which is adapted to be thrown into contact with both these drivers or disengaged therefrom, the result being that when it is thrown into contact the two drivers will be rotated in opposite directions by power transmitted from the shaft 2 through the driver 4, which is turned in one direction and through the transmitter 7 to the driver 6, which, with its sleeve, will be rotated in the opposite direction. The drivers and transmitters are here shown as having contacting faces, and the transmitter 7 is mounted in the plane of the axis of the drivers 4 and 6, so that it can be moved to and from them. As here shown, it is mounted upon a shaft 8, which is slidable in journal-boxes, as at 9, or the transmitter itself may be mounted so as to slide upon a stationary shaft or guide in the place of 8. The opposite end of the sleeve 5 from the driver 6 carries one member 10 of a clutch, and the other member 18, which is keyed to the shaft, is adapted to be thrown into or out of engagement with the member 10 of the clutch.

In order to move the transmitter 7 and the clutch member 18 in unison with each other, I have shown the following mechanism:

12 is a clutch-lever fulcrumed, as shown, at 13, and by the movement of this lever the cone 11 is moved so that the member 18 of the clutch may be thrown into or out of contact with the member 10. 14 is a bell-crank lever, one end of which is so connected as to move the transmitter to or from the drivers 4 and 6, and the other end is connected by a rod or link 15 with the lever 12, so that the two will move in unison. The operation will then be as follows: When the lever 12 is moved so as to throw the transmitter 7 into engagement with the drivers 4 and 6, the engine-shaft 2, turning always in one direction, will transmit power through a driver 4, and through the transmitter 7 to the driver 6, which, with the sleeve 5, turning freely upon the shaft 2, will be rotated in the opposite direction. By reason of the lever connections 12 14 15, previously described, the movement which throws the transmitter 7 into contact with the drivers withdraws the clutch member 18 from 10, and this clutch member will revolve in the same direction with the shaft 2, because it is keyed on that shaft, while the other member 10, being mounted upon the sleeve 5, will partake of the motion of the driver 6 in the opposite direction. When the lever 12 is moved so as to disengage the transmitter 7 from the drivers 4 and 6, no power will be transmitted to the sleeve. By a further movement of the lever in the same direction the clutch member 18 will be engaged with the clutch member 10, and the shaft 2 will drive the sleeve 5 in the same direction that itself is turning.

Any suitable or desired form of clutch may be employed. I have here shown a clutch consisting of a ring 16, having arms connecting it with a central hub 18, and at opposite sides of these arms the ring is cut or separated, as shown at 19, in the manner of a compensating balance-wheel of a chronometer. Pivoted to the radial arms are levers 20, the outer ends of which contact with the free ends of the rim 16. The inner ends lie in such position with relation to the hub and shaft that when the cone 11 is moved toward them its cone-shaped end, passing between these levers, will separate them, and this will expand the ring 16 inside of the drum 10 until the frictional grip between the two is sufficient to transmit motion from one to the other. Whenever the cone 11 is withdrawn from between the inner ends of the levers 20, the elasticity of the sectional rim 16 will cause it to contract, so as to no longer drive the rim 10, which is carried by the sleeve 5.

In order to transmit the movements of the sleeve 5, drivers 22 and 23 of any desired description may be employed. In the present case I have shown these drivers in the form of sprocket-wheels, and by means of chains passing over them to the corresponding sprockets 24 and 25 upon the shaft to be driven the power is transmitted. These sprockets are of different diameters in order to provide for a change of speed, which is necessary when applied to motor-vehicles to drive them faster or slower in either direction.

Intermediate between the sprockets 22 and 23 is a clutch member 26, which travels upon a feather on the sleeve 5, and when this clutch member stands intermediate between the two sprocket-wheels no power will transmitted to either. When moved in o direction to engage with one of said sproc ets, as 22, the motion of the sleeve 5 w ll b transmitted to drive this sprocket, and through it the sprocket-wheel 24 upon the driving-shaft, at the higher rate of speed. When the lever 27 is moved to shift the clutch 26 to engage with the smaller sprocket 23, this sprocket will be driven and power transmitted to the sprocket-wheel 25 at the slower rate of speed. Thus the apparatus is available for transmitting motion in either direction from the power-shaft, which is always rotating in one direction, and the speed may be changed whatever may be the direction of rotation of the shaft The feature of reversing mechanism by simultaneously engaging the transmitter and disengaging the clutch or engaging the clutch and disengaging the transmitter is an important part of my invention, and it will be manifest that the intermediate connecting-levers, which are here shown and described, are representative of any equivalent mechanical contrivance by which the same movements of the transmitter and clutch can be effected.

Having thus described my invention, what I claim as new, and desire to secure by Letters Patent, is—

1. The combination with a driving-shaft, of a driver fixed thereto, a sleeve having its major axis in the direction of the length of the shaft and loosely mounted thereon, a second driver on the sleeve, a transmitter adapted to occupy the space between the two drivers and mounted in the plane of the axis of the latter, a means for engaging or disengaging the transmitter with the two drivers, a clutch member fixed to the driving-shaft, a second clutch member rigid with the opposite end portion of the sleeve, and a unitary mechanism whereby the clutch is engaged or disengaged simultaneously with the disengagement or engagement of the transmitter with the drivers.

2. The combination with a driving-shaft, and a driver fixed thereto, of a sleeve loosely mounted upon the shaft and having its major axis in the direction of the length thereof, a second driver rigid with the sleeve and disposed in opposition to the first-named driver, a transmitter adapted to occupy the space between the two drivers and mounted and movable simultaneously into or out of contact with both drivers, a clutch member carried by the sleeve and turnable therewith, a second clutch member fixed to the driving-shaft, a cone and lever by which the last-named clutch member is moved into or out of contact with the first-named member, and connection between the lever and the transmitter whereby the latter is disengaged from the drivers when the clutch members are in engagement and is engaged with the drivers when the clutch members are disengaged.

3. The combination with a driving-shaft, of a driver fixed thereto, a sleeve loosely mounted upon the shaft, having its major axis in the direction of the length thereof, a second driver rigid with the sleeve and disposed in opposition to the first-named driver, a transmitter adapted to occupy the space between the opposing drivers and movable into and out of contact with said drivers, a clutch member carried by the opposite portion of the sleeve, a second clutch member fixed to the shaft, a lever for the transmitter, a lever for the clutch, and a connection uniting the two levers whereby the transmitter and clutch are moved simultaneously to engage one and disengage the other, sprocket-wheels loose upon the sleeve, clutch members fixed to said wheels, an intermediate clutch member slidable upon the sleeve, means for moving the intermediate member into engagement with either of the sprocket clutch members, a driven shaft, sprocket-wheels thereon, and chains extending therefrom to the sprockets on the sleeve.

4. The combination with a revoluble shaft, a loose sleeve thereon, and drivers fixed to the shaft and sleeve, of loose sprockets upon the sleeve and a clutch member also on said sleeve and adapted to engage either of said sprockets, a transmitter adapted to occupy the space between the two drivers, means for moving the transmitter into or out of contact with the drivers, to reverse or stop the sleeve, a driven shaft, and transmitting devices between it and the said sprockets.

5. The combination of a revoluble shaft, a loose sleeve thereon, drivers fixed to the shaft and sleeve, sprockets loose on the sleeve, clutch members fixed to said sprockets, a clutch member between the first-named clutch members and adapted to engage either of the latter, a transmitter adapted to occupy the space between the two drivers, a lever connected with the transmitter, clutch members between the shaft and sleeve, a lever for actuating the last-named clutch members, a connection from one lever to the other whereby both operate in unison, a driven shaft, and transmitting devices between it and the sprockets on the sleeve.

In witness whereof I have hereunto set my hand.

JOHN E. DOAK.

Witnesses:
S. H. NOURSE,
JESSIE C. BRODIE.